Figure 1:
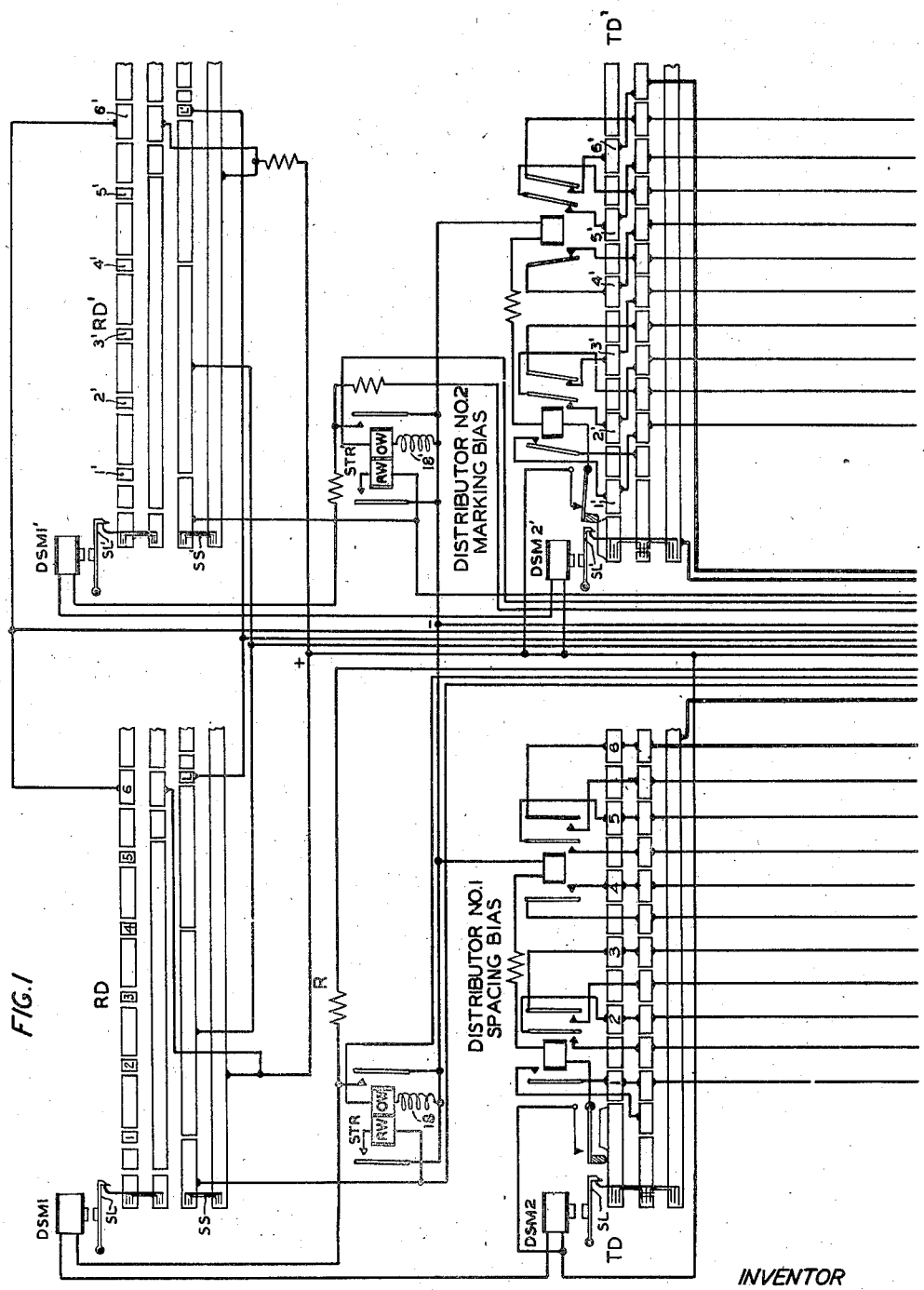

Patented Mar. 14, 1933

1,900,992

UNITED STATES PATENT OFFICE

THOMAS A. McCANN, OF EAST ORANGE, NEW JERSEY, ASSIGNOR TO AMERICAN TELEPHONE AND TELEGRAPH COMPANY, A CORPORATION OF NEW YORK

IMPULSE TRANSMISSION SYSTEM

Application filed January 9, 1932. Serial No. 585,757.

This invention relates to automatic switching circuits and more particularly to circuits used in connection with impulse transmission systems. The switching circuit described herein is of general application and may be employed generally for automatic switching of distributors and/or other devices for a variety of purposes. A specific aspect of the invention resides in the combination of such a switching circuit with a mechanism which is to be alternately and automatically connected to a load circuit, such as bias distributors, or telegraph transmitters operated by perforated tape.

One object of this invention is to automatically vary bias of transmitted signal impulses between predetermined values alternately marking and spacing.

Another object of this invention is to alternately and automatically connect a printer to two sources of oppositely biased signals in order to quickly and simply ascertain the most advantageous adjustment of the receiving selecting mechanism of the printer.

A further object of this invention is to provide means for simply and expeditiously testing receiving apparatus for the reception of telegraph signals to determine the maximum bias of the received signals which the apparatus will tolerate.

A still further object of the invention is to alternately and automatically switch a high speed impulse distributor from one to the other of two tape transmitters when the supply of perforated tape on one of said transmitters runs low, in order to utilize efficiently the line time of such a system.

A previous device described in joint application for patent of E. F. Watson and A. E. Hunt, Serial No. 475,098, filed August 13, 1930, comprises a distributor which may be adjusted to transmit telegraphic code impulses with a bias adjustable between about 50% marking bias and 50% spacing bias. A function of this prior device was to transmit impulses which could be employed to test telegraph printers. In utilizing it for such purpose it was customary to manually shift certain segments of the distributor of the device to change the bias of the transmitted impulses to determine the degree of bias of signal impulses which the printer under test could interpret without error.

The present invention, in one of its aspects, comprises means whereby the manual shifting of the segments from spacing to marking bias is avoided. A switching circuit is provided to connect the circuit or printer under test first to one and then the other of a plurality of distributors which may be adjusted or designed to transmit biased signals of different nature and any desired degree of bias. The switching circuit is controlled through one or more special code groups sent from the distributor which is connected at any given time. Hence, with a suitable test tape, the desired code group may be punched at any suitable interval in the tape to operate the switch automatically.

In accordance with this aspect of the invention, there are provided two distributors for transmitting biased signals. These distributors are supplied with signal impulses by a source of signals such as a conventional tape transmitter into which is fed a tape which is perforated in accordance with a test sentence which is transmitted to the printer to be tested in such a manner that an arbitrarily selected part of the sentence is printed with a predetermined amount of spacing bias and the remaining part of the sentence with a predetermined amount of marking bias, whereby the most advantageous adjustment of the printer to reproduce the sentence correctly may be effected with a minimum amount of effort and intercommunication on the part of the testing personnel. The two parts of the test sentence are separated by two or more "blank" signals (code groups) and the switching operation from one distributor to the other takes place automatically when "blank" signals are sent through the tape transmitter, two "blank" signals in succession being used so that the changeover may be completed without an error due to the switching of the distributors.

The invention may be more readily understood from the following description of its features and of its principles of operation in conjunction with the accompanying drawings which, when juxtaposed as indicated, constitute a diagrammatic representation of apparatus and circuits embodying the invention. In these drawings, identical reference characters designate similar parts.

Fig. 1 is a schematic circuit diagram of two conventional distributors having transmitting and receiving rings in which the transmitting rings of one of the distributors have been modified to transmit impulses having up to about 50% spacing bias and the transmitting rings of the other distributor have been modified to transmit impulses having up to about 50% marking bias. These bias distributors and their mode of operation have been described in detail in the above mentioned joint application of E. F. Watson and A. E. Hunt.

Figure 2:
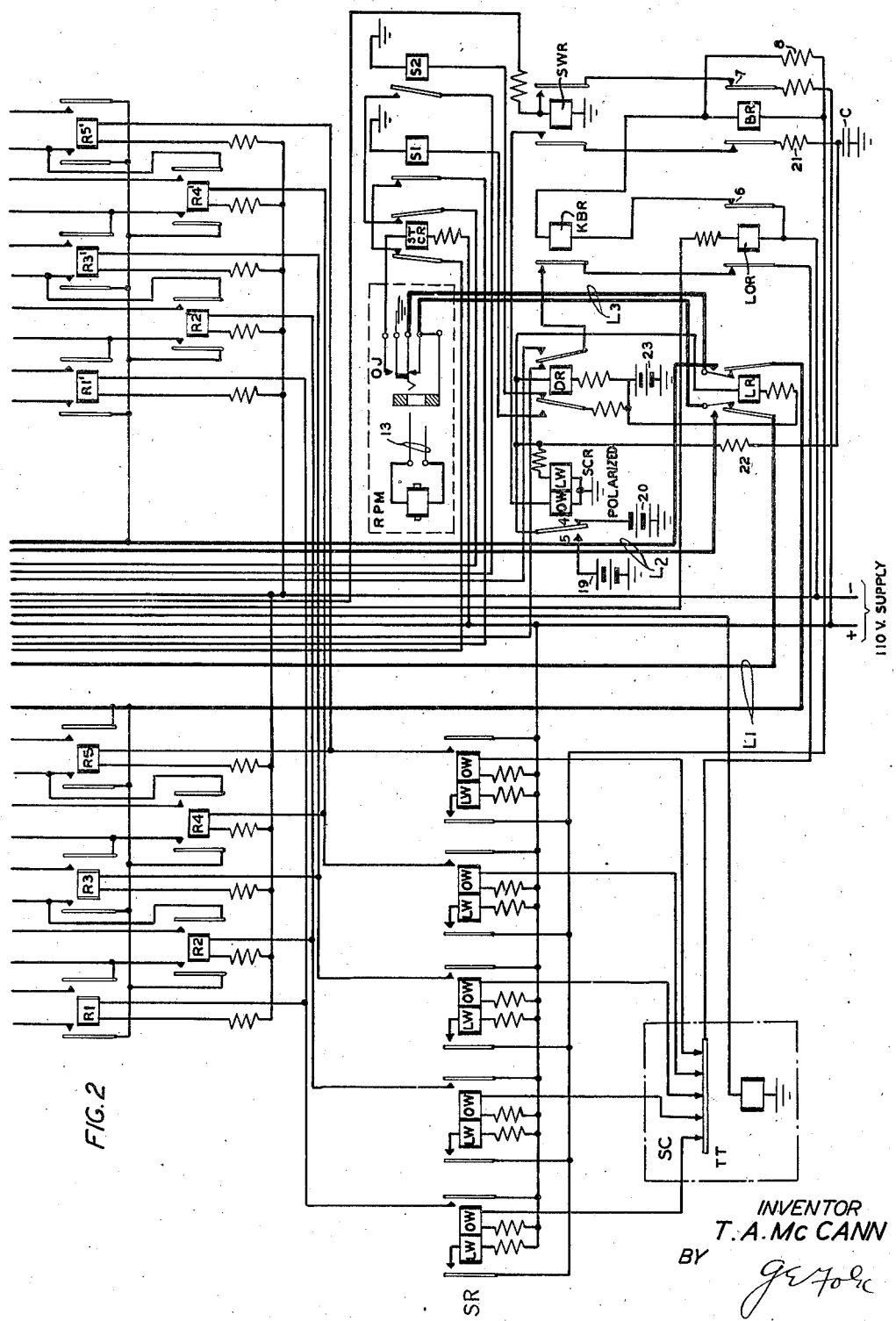

Fig. 2 is a schematic circuit diagram of the transmitting relays operating in conjunction with the transmitting rings shown in Fig. 1, as well as a schematic circuit diagram of the switching circuits which chiefly embody the novel features of this invention.

In the drawings, there are provided in accordance with the present invention two receiving distributors RD and RD' of the start-stop type. They are mounted on the same rotating shaft or are otherwise maintained in synchronism with two transmitting distributors TD and TD' in which one segment is provided for the transmission of a starting impulse, five segments for code impulses, and one segment for a stop impulse. Two sending start relays STR and STR' and distributor start magnets DSM1, DSM2 and DSM1', DSM2' controlled thereby, serve to control the starting of any of the distributors for each single rotation thereof. The transmitting distributor TD may be adjusted to transmit signal impulses having up to 50% spacing bias and TD' may be adjusted to transmit impulses having 50% marking bias. The mode of operation and the method of adjustment of these distributors have been described in detail in the above mentioned application and need not be repeated here. Each of the bias distributors has associated with it sending control relays R1 to R5 and R1' to R5' respectively, as well as five sending relay contacts SR each having a locking winding LW and an operating winding OW. The printing mechanism which is to be supplied with oppositely biased test signals by the bias distributors is shown in a conventional manner in the form of a receiving printer magnet RPM. In order to connect the bias distributors into the printer circuit, it is merely necessary to plug the cord 13 of the printer into the output jack OJ. Although only one printer and one output jack are shown, it is understood that a plurality of output jacks may be provided for receiving as many cord circuits as there are printers to be tested. The automatic switching from one bias distributor to the other is accomplished by means of the series of relays shown in the lower right-hand corner of Fig. 2 and of which the polarized switching control relay SCR, the switching relay SWR, the loop relay LR, the distributor relay DR, the keyboard relay KBR, the lockout relay LOR, the blank relay BR, the condenser C, the batteries 19 and 20, and the resistances 21 and 22 form the most important elements from the standpoint of operation.

The operation of the invention will now be discussed in connection with the drawings. Assume that it is desired to test the ability of the printing mechanism RPM to operate on biased signals. Assume also that the tape to be fed through the tape transmitter TT has been perforated in accordance with a standard test sentence so that two parts of the test sentence are separated by at least two blanks. The tape transmitter TT is started by plugging the printer RPM into jack OJ; this closes the auxiliary contacts on this jack which connect ground to the start control relay STCR. The relay STCR completes a circuit from the negative terminal of the current supply line, through the retardation coil 18, the operating winding OW of the start relay STR, the left back contact of relay S1, the left contact of the start control relay STCR, the start segments SS and brushes to the positive current supply on the common ring. The operation of the start relay STR completes a circuit from the negative terminal of the power supply through the distributor start magnets DSM1 and DSM2 to the positive terminal, thus causing the start latches SL to operate and release the brushes. The start relay STR also connects the negative terminal through the sending contacts SC of the tape transmitter TT and the operating windings of the sending relays SR to the positive circuit terminal. This circuit may be traced as follows: Right hand contact of relay STR, resistance R, right hand contact of the distributor relay DR, the contact of the keyboard relay KBR, the left contact of the lockout relay LOR, the sending contacts SC of the tape transmitter TT, the operating windings OW of the sending relays SR, to the positive terminal of the current supply.

The sixth segment of each of the receiving distributors RD and RD' is used in the switching circuit which automatically changes the transmission from one distributor to the other when two consecutive blanks in the test sentences are sent through the tape transmitted. It functions to connect the positive terminal of the current supply to the switching relay SWR as the brushes traverse the sixth receiving segment. If the blank relay BR is released at the time the brushes pass over the sixth receiving segment, the switching relay SWR will lock up through contact 7 of the blank relay BR. The circuit of the blank relay BR may be traced from the negative terminal of the current supply through contact 6 of the lockout relay LOR, the winding of the keyboard relay KBR and its own winding through the contacts of the locking windings LW of the sending relays SR to the positive terminal of the current supply. The winding of the blank relay BR is shunted by a resistance 8 to retard its release so that its back contact 7 will not be closed before the contacts of the switching relay SWR have had time to open. If this precaution were not taken the switching control relay SCR might be falsely operated and cause the transmission to be switched from one distributor to the other when this is not desired.

The combination sent from the bias distributor is dependent upon the combination set up in the tape transmitter. If a character combination is set up in the tape transmitter TT, the blank relay BR will be operated by the current passing through the locking windings LW of the sending relays SR. If, however, a "blank" signal is set up in the tape transmitter, none of its five contacts can close and consequently none of the sending relays SR will be operated, and the blank relay BR, which is in series with the locking windings LW of the sending relay SR, will remain released (i. e., its contacts will be closed) as the brushes traverse the segments. The switching relay SWR closes its contacts once for every rotation of the distributor, i. e., when the brush passes over the sixth segment. With the blank relay BR released and its contacts closed, operation of the switching relay SWR will complete a circuit from ground through the operating winding OW of the switching control relay SCR, through the left-hand switching relay contact, through the left-hand blank relay contact, through a resistance 21 (750 ohms) to the condenser C which is charged with a negative potential from battery 20; the completion of the circuit thus traced will permit the negative charge of the condenser to flow through the operating winding OW of the polarized switching control relay SCR to ground in such a direction as to move the armature of this relay to the opposite contact in spite of the small current in the holding winding LW which tends to hold the armature on the contact it happens to be on. A circuit may also be traced from condenser C through resistance 22 (24,000 ohms) to the armature of the switching control relay SCR which is shown at rest on its negative contact 4. When the condenser is discharged through the operating winding OW of relay SCR to ground, and the switching relay SWR opens its contact (after the brush has left segment 6), the condenser is again charged, but with opposite polarity, from battery 19, through the armature and contact 5 of the switching control relay SCR and the resistance 22, and is thus ready to be discharged when the next "blank" signal is passed through the tape transmitter. While the armature of the switching control relay SCR remains on its negative contact 4, the distributor relay DR and loop relay LR remain operated due to the flow of current from positive battery 23 through the windings of these relays in parallel, through the armature and contact 4 of the switching control relay SCR to negative battery 20.

When the switching control relay is on its positive contact 5, the distributor and loop relays DR and LR are short-circuited and hence released; the loop circuits L1 and L2 of the bias distributors Nos. 1 and 2 are terminated on the contacts of the loop relay LR and this relay thus switches the loop circuit 13, which contains the printer to be tested, from one distributor which sends signals with marking bias to the other which sends signals biased to spacing. The switching is effected by the two pairs of contacts of the loop relay LR in such manner that the connection with one pair of contacts is not interrupted before the connection with the other pair of contacts is established, so that the loop circuit is not momentarily opened by the operation of this relay. The distributor relay DR switches the start circuits from one distributor to the other through slow-release relays S1 and S2. The circuit is shown with the testing loop circuit 13 and start circuits connected to distributor No. 1. When the distributor relay DR releases its armature to switch the start circuit to distributor No. 2, relay S1 is operated immediately, relay S2 is disconnected from battery 20 and releases (closes) its contact one-third to one-half second later. This slight delay is necessary to permit the printer in the loop which is being tested with biased signals to complete the reception of the signal started from distributor No. 1 before distributor No. 2 is started. The actual switching of the loop 13 from one distributor to the other takes place as the brushes traverse the sixth segment. As the brushes traverse the segment to transmit the "blank", the tape transmitter is stepped ahead to the next character. This character is not transmitted into the loop 13 due to the loop and distributor relays operating almost immediately as the brushes ride upon the sixth segment. Somewhat later the inner set of brushes pass over the segment L, operate the lockout relay LOR and clear the sending relays for the next character combination. Still later, one of the slow release "S" relays closes its contact which causes the start relay STR' of distributor No. 2 to operate. The brushes of this distributor pass over the segments transmitting a "blank" due to the lockout relay having cleared out as explained above. On this revolution of the brushes, however, the tape transmitter is stepped ahead to the following character. From the above it may be understood that the switching operation is actually performed on a single "blank" in the tape, but that two "blanks" are necessary in order not to lose any characters.

As mentioned previously, the switching relay SWR is arranged to lock itself through the back contact and right hand armature of blank relay BR if the blank relay is not operated. This feature is provided so that one "blank" signal or a consecutive succession of "blanks" will cause the switching control relay SCR to be operated only once. This is desirable so that when a length of blank tape is run through the tape transmitter, this will not cause rapid switching between distributors.

Other modes of application of the switching circuit described herein will suggest themselves to those skilled in the art. For example, as mentioned above, the circuit may find application in high speed telegraph systems comprising a high speed switching distributor whose transmitting capacity is such as to exceed the maximum capacity at which a single tape perforator is able to feed it with code signals. In accordance with this example of an embodiment of this invention, the full transmission capacity of the line may be efficiently utilized for sending messages by providing two code perforators and tape transmitters arranged in combination with the switching circuit described herein in such a manner that when one perforator operator whose tape is being fed into the tape transmitter sees his supply of code-perforated tape run low, he may cause the other tape transmitter which is better supplied with tape to be switched in connection with the high speed sending distributor by perforating the tape with a particular code combination.

What is claimed is:

1. In an impulse transmission system, two rotary impulse distributors adapted to be alternately and automatically connected to a load circuit, circuits whereby one of said distributors at a time is connected to said load circuit, a plurality of relays, one of said relays being actuated to close its contact once during every rotation of either of said distributors, and the other of said relays being actuated at the transmission of a special code impulse group over said distributor whereby the other of said distributors is caused to be connected to the load circuit.

2. In an impulse transmitting system comprising a rotary distributor adapted to transmit a train of impulses having a marking bias and a similar distributor adapted to transmit a train of impulses having a spacing bias, an impulse receiving mechanism, means for alternately connecting said distributors to said receiving mechanism, said means comprising two relays, one being actuated once for every rotation of the connected one of said distributors and the other relay being responsive to a code group consisting entirely of spacing impulses.

3. In combination, a signal impulse receiving mechanism, two impulse distributors, one being adapted to transmit impulses having spacing bias and the other being adapted to transmit impulses having marking bias, means for controlling the permutations of said impulses, and means including a relay responsive to a particular permutation of said impulses for interchanging the connection of said distributors to said receiving mechanism.

4. The method of testing a communication system which includes a signal recording apparatus, which comprises transmitting signal impulses to said apparatus, said impulses consisting of code combinations of spacing and marking impulses, alternating the sequence of the impulse transmission in a manner such that a series of signal impulses having spacing bias is followed by a series of impulses having marking bias, and causing the impulses to control the change from one of said series to another.

5. In a signaling system, a code group impulse transmitting mechanism, an impulse receiving mechanism, two rotary distributors, means for causing said distributors to rotate and stop alternately for alternately distributing to said receiving mechanism a succession of impulses in which the marking impulses are abnormally lengthened and a succession of impulses in which the spacing impulses are abnormally lengthened, and means including two relays for automatically controlling the duration of the time intervals allocated to the transmission of the two successions of impulses respectively, one of said relays being actuated once for every rotation of the rotating one of the distributors and the other of said relays being actuated by means responsive to a code group consisting entirely of spacing impulses.

6. A signaling system comprising at least one permutation code impulse transmitter and a condenser, a source of current for charging said condenser, and interconnecting devices whereby the transmission from said transmitter of a particular code group discharges said condenser.

7. A signaling system comprising a line, a plurality of impulse distributors of which one is connectable at a time to said line, a permutation code transmitter (TT) and an electromagnetic device (SCR) having a plurality of positions, circuit and relay instrumentalities connecting said distributors, transmitter and device, whereby the transmission of at least one special code group causes said device to interchange the connection of said distributors with the line.

8. In combination, a permutation code impulse sender (TT), a circuit (13), a plurality of impulse distributing devices (TD and TD') a circuit changer (SCR) for successively connecting said devices and impulse sender to said circuit, and instrumentalities (SWR, BR, etc.) external to said code impulse sender and including a relay (BR) controlled under the influence of a particular code combination sent from said sender for substituting one of said devices for another.

9. In an impulse transmission system, a signaling line, a plurality of tape operated devices for transmitting code combinations of current impulses over said line, means including a condenser and two relays for causing the transmission of impulses to be switched from one to the other of said devices, one of said relays being actuated by the transmission of a particular code combination from one of said devices and the other of said relays being actuated at substantially equal time intervals.

10. System as defined in claim 9 in which said condenser is charged and discharged in such a manner that on successive operations of said switching devices one of said tape operated devices is connected to said line circuit one-half the number of said successive operations, and the other tape operated device is connected to said line circuit the other half of said successive operations.

11. In a switching system, a signaling line, a permutation code impulse sender, two rotary distributors connected to said line and adapted to rotate alternately for alternately distributing said impulses to said signaling line, a switching circuit controlled by a particular combination of code impulses and timed by the rotating one of said distributors to alternately change the line connection from one to the other of said distributors.

12. In an electrical system, a line, a permutation code transmitter, two rotary devices adapted to be alternately rotated and connected to said line, a circuit including two circuit closers each having a plurality of contacts, means for closing the contacts of one of said circuit closers once for every rotation of the rotating one of said devices and for closing the contacts of the other circuit closer by a particular code combination set up in one of said code transmitters, a polarized relay having an operating winding and a holding winding, an armature and a pair of contacts for said relay, two oppositely polarized sources of current, a condenser for receiving and storing a charge alternately from one and then the other of said sources of current, means whereby the coincidence of the closure of said circuit closers causes said condenser to discharge through the operating winding of said relay and to change the line connection from one to the other of said rotating devices, and means for preventing undesired switching due to an abnormally long succession of code combinations.

13. System as defined in claim 12 in which said means for preventing false switching include means for retarding the release of one of said circuit closers whereby at least one of its contacts is prevented from closing before the contacts of the other circuit closer are opened.

In testimony whereof, I have signed my name to this specification this 8th day of January 1932.

THOMAS A. McCANN.